US011820525B2

(12) United States Patent
Arnold et al.

(10) Patent No.: US 11,820,525 B2
(45) Date of Patent: Nov. 21, 2023

(54) METHOD FOR CONTROLLING A MULTIROTOR AIRCRAFT FOR THE VERTICAL TAKE-OFF AND LANDING AS WELL AS MULTIROTOR AIRCRAFT

(71) Applicant: Germandrones GmbH, Berlin (DE)

(72) Inventors: Felix Arnold, Stuttgart (DE); Martin Tomenendal, Beilngries (DE)

(73) Assignee: Germandrones GmbH, Berlin (DE)

( * ) Notice: Subject to any disclaimer, the term of this patent is extended or adjusted under 35 U.S.C. 154(b) by 151 days.

(21) Appl. No.: 17/431,943

(22) PCT Filed: Feb. 5, 2020

(86) PCT No.: PCT/EP2020/052887
§ 371 (c)(1),
(2) Date: Aug. 18, 2021

(87) PCT Pub. No.: WO2020/169346
PCT Pub. Date: Aug. 27, 2020

(65) Prior Publication Data
US 2021/0380267 A1    Dec. 9, 2021

(30) Foreign Application Priority Data

Feb. 19, 2019    (DE) .................... 10 2019 202 241.3

(51) Int. Cl.
| B64D 31/06 | (2006.01) |
| G05D 1/10 | (2006.01) |
| B64D 27/24 | (2006.01) |
| B64C 39/02 | (2023.01) |
| B64D 45/00 | (2006.01) |
| B64U 10/13 | (2023.01) |

(52) U.S. Cl.
CPC ............. *B64D 31/06* (2013.01); *B64D 27/24* (2013.01); *G05D 1/102* (2013.01); *B64C 39/024* (2013.01); *B64D 2045/0085* (2013.01); *B64D 2221/00* (2013.01); *B64U 10/13* (2023.01); *B64U 2201/104* (2023.01)

(58) Field of Classification Search
CPC .............................. B64D 31/06; B64D 27/24; B64D 2045/0085; B64D 2221/00; B64U 10/13; B64U 2201/104; G05D 1/102; B64C 39/024
See application file for complete search history.

(56) References Cited

U.S. PATENT DOCUMENTS 9,446,837 B2 * 9/2016 Wildschek .............. B64C 13/16
9,618,939 B2    4/2017 Wolf et al.
(Continued)

FOREIGN PATENT DOCUMENTS

EP          3243749 A1     11/2017
WO     2013174751 A2     11/2013

OTHER PUBLICATIONS

Hitt et al., "Handbook—vol. 1 Validation of Digital Systems in Avionics and Flight Control Applications", National Technical Information Service, 1983, 472 pages, vol. 1.
(Continued)

*Primary Examiner* — Mussa A Shaawat
(74) *Attorney, Agent, or Firm* — The Webb Law Firm

(57) ABSTRACT

A method for controlling a vertical take-off and landing multirotor aircraft and a multirotor aircraft using the controller.

20 Claims, 1 Drawing Sheet

(56) References Cited

U.S. PATENT DOCUMENTS

| | | | |
|---|---|---|---|
| 10,137,983 B2 | 11/2018 | Horn | |
| 2007/0007385 A1 | 1/2007 | Potter et al. | |
| 2008/0203224 A1 | 8/2008 | Yount et al. | |
| 2011/0180656 A1 | 7/2011 | Shue et al. | |
| 2012/0158215 A1* | 6/2012 | Sun | B64C 27/20 |
| | | | 701/1 |
| 2015/0012154 A1* | 1/2015 | Senkel | B64C 27/473 |
| | | | 701/4 |
| 2015/0212523 A1* | 7/2015 | Wolf | B64D 45/00 |
| | | | 701/5 |
| 2016/0059958 A1* | 3/2016 | Kvitnevskiy | B64C 27/08 |
| | | | 244/17.23 |
| 2016/0144957 A1* | 5/2016 | Claridge | B64C 39/024 |
| | | | 244/6 |
| 2016/0144982 A1* | 5/2016 | Sugumaran | A01D 41/12 |
| | | | 244/108 |
| 2018/0237148 A1* | 8/2018 | Hehn | G05D 1/0077 |
| 2018/0239366 A1 | 8/2018 | Cutler et al. | |
| 2018/0307231 A1* | 10/2018 | Sorton | B64D 31/06 |
| 2019/0176981 A1* | 6/2019 | Gaillimore | B64C 3/32 |
| 2020/0103922 A1* | 4/2020 | Nonami | G06F 17/16 |

OTHER PUBLICATIONS

Kornecki et al., "Approaches to Assure Safety in Fly-By-Wire Systems: Airbus vs. Boeing", Embry Riddle Aeronautical University, 2004, 6 pages.

Sghairi et al., "Challenges in Building Fault-Tolerant Flight Control System for a Civil Aircraft", IAENG International Journal of Computer Science, 2008, 5 pages, vol. 35:4.

* cited by examiner

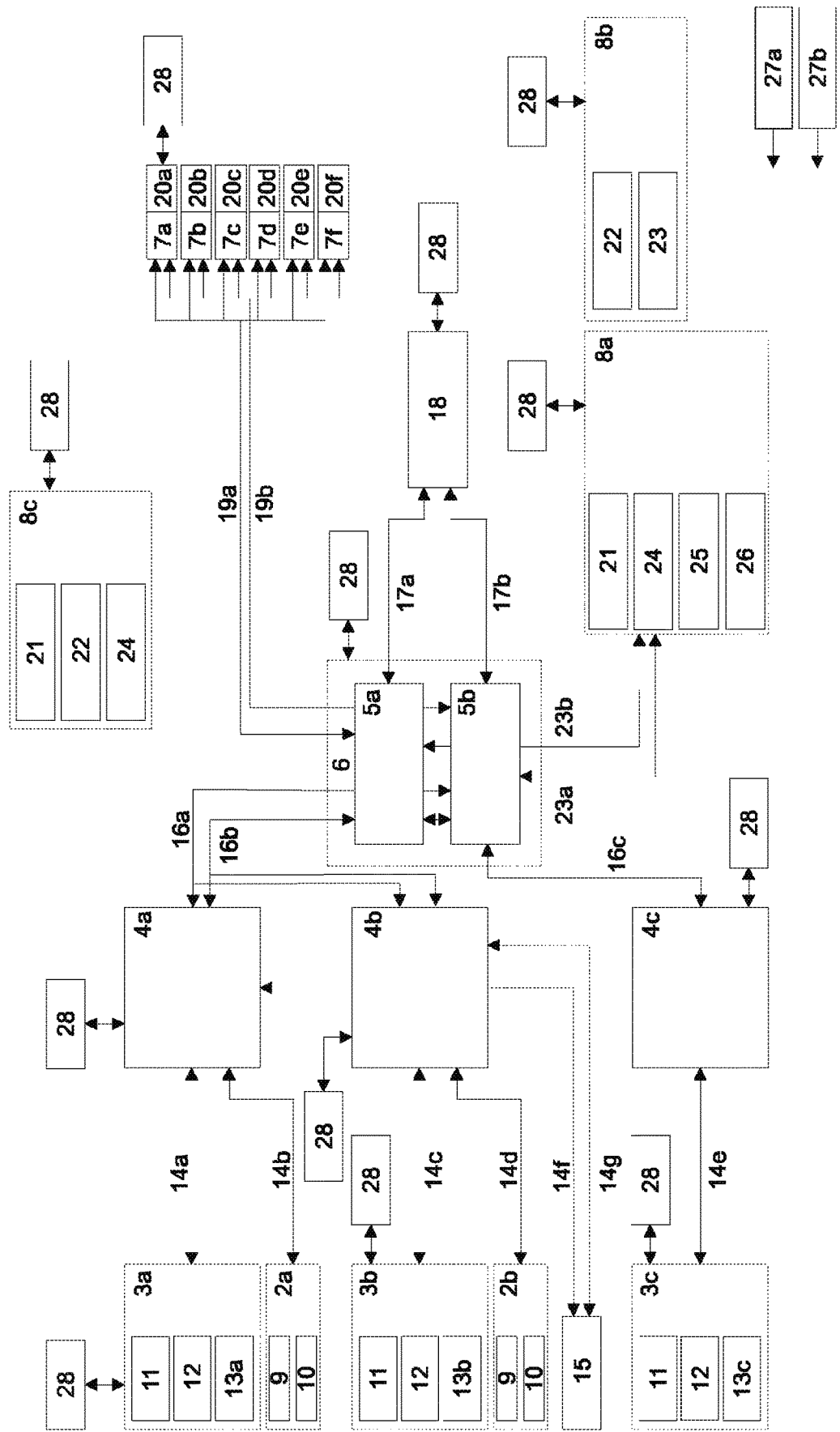

METHOD FOR CONTROLLING A MULTIROTOR AIRCRAFT FOR THE VERTICAL TAKE-OFF AND LANDING AS WELL AS MULTIROTOR AIRCRAFT

CROSS-REFERENCE TO RELATED APPLICATIONS

This application is the United States national phase of International Application No. PCT/EP2020/052887 filed Feb. 5, 2020, and claims priority to German Patent Application No. 10 2019 202 241.3 filed Feb. 19, 2019, the disclosures of which are hereby incorporated by reference in their entirety.

BACKGROUND

Field

The invention relates to a method for controlling a multirotor aircraft for the vertical take-off and landing as well as to a corresponding aircraft which uses the control.

Multirotor aircraft with several rotors, in particular with four or more rotors have been part of the state of the art for some time now. The development of these multirotor aircraft—manned or unmanned—has been increasingly advanced more and more in recent years.

Background

EP 3 243 749 A1 discloses an unmanned aircraft comprising a fuselage, a left and a right wing which are connected to the fuselage, in order to generate lift in the forward flight, a left thrust generating unit which is carried by the left wing, and a right thrust generating unit which is carried by the right wing. The unmanned aircraft furthermore comprises a vertical stabiliser, an upper unit which generates thrust and which is assembled in an upper section of the vertical stabiliser, and a lower unit which generates thrust and which is assembled on a lower section of the vertical stabiliser. An on-board electricity source is provided for driving the thrust generating units. The left, right, upper, and lower thrust generating units ensure a forwards thrust during the horizontal flight and also a vertical thrust, so that the unmanned aircraft can take off and land vertically. A flight control system which comprises temperature sensors, pressure sensors and acceleration sensors, a magnetometer, a gyroscope, and a global positioning system (GPS) is used for the control of the unmanned aircraft. The disadvantage with this is the fact that the control of the described, unmanned aircraft is very prone to malfunctions or failures of the measurement technology, in particular of the sensor units.

SUMMARY

It is therefore the object of the invention to provide an improved method for the control of a multirotor aircraft for the vertical take-off and landing, and the respective multirotor aircraft, without being at the mercy of the proneness of the measuring technology, in particular the sensor units, to malfunction or fail.

Concerning a method of the initially mentioned type, this object is achieved by way of On account of the redundancy of multirotor aircraft control units and evaluation units, said redundancy being formed in the multirotor aircraft, it is ensured that the evaluation unit of the multirotor aircraft determines a control command even given a failure of redundant measuring technology, in particular of the sensor units, and transfers this control command to the control units which are connected to the drive unit, for the control of the drive units.

According to an advantageous design of the method according to the invention, the evaluation unit comprises at least one comparator, wherein the comparator compares the control data of the multirotor aircraft control units with one another and the evaluation unit according to step e) then in dependence on a comparison result value which is used as an evaluation result value of the evaluation unit provides a control command as soon as this control command determines a precise agreement of the control data which has been compared to one another in the comparator or an agreement within a tolerance range with respect to the control data.

A further advantage of the method according to the invention is that the comparator assume a rank in a comparator ranking order of the multirotor aircraft and the multirotor aircraft control units assume a rank in a multirotor aircraft control unit ranking order of the multirotor aircraft, wherein the highest ranking comparator is connected to the multirotor aircraft control units of the same and lower rank and the other comparator are each connected to the multirotor aircraft control units of the higher, equal and lower rank, and the evaluation unit according to step e) then in dependence on a comparison result value which is used as an evaluation result value of the evaluation unit provides a control command as soon as this control command determines a precise agreement of the control data which has been compared to one another in the comparator or an agreement within a tolerance range with respect to the control data, wherein a comparison of the control data is effected in accordance with the ranking order of the comparator from the highest ranking comparator to the lowest ranking comparator as soon as the comparison result value determines no agreement within a tolerance range with respect to the control data. By way of this, it is always ensured that the highest ranking comparator of the evaluation unit which provides an agreement in the comparison of the control data transmits a control command to the control unit. The control command which is provided by the evaluation unit thus in the simplest manner corresponds to the control data of the highest ranking multirotor aircraft control unit which transmits the control data for a comparison in the deciding comparator.

The tolerance range preferably has a spatial tolerance and/or a temporal tolerance. On account of computing inaccuracies and rounding errors, the introduction of tolerances—spatially and/or temporally—is very advantageous. Particularly preferably, the tolerance range has a deviation of smaller or equal to 5% with respect to the control data which is transmitted to the comparator. Very particularly preferably, the tolerance range has a deviation of smaller or equal to 5% with respect to the highest ranking control data which is transmitted to the comparator. By way of this it is ensured that the control data is preferably used by the highest ranking multirotor aircraft control unit and other control data of lower ranking multirotor aircraft control units are only used given a failure of this.

Advantageously, the evaluation unit transfers a warning hint to the control command unit as soon as the evaluation result value lies outside the tolerance range. Such a warning hint to the control command unit in a suitable form, for example by way of a flashing of a control lamp discloses difficulties with the evaluation unit on determining the control command, for example in the highest ranking comparator. Subsequent error analyses or emergency programs are to be initiated on account of the warning hint. Advantageously, the evaluation unit provides a control command for an emergency landing as soon as the evaluation result value of the lowest ranking comparator lies outside the tolerance range.

According to an advantageous design of the method according to the invention, the sampling rate according to step a) has a frequency of 1 Hz to 2 kHz, in particular from 200 Hz to 1.0 kHz. On account of the high sampling rates, very much sensor data is transmitted to the multirotor aircraft flight control unit which this converts into control data for the evaluation unit, so that this is available in the evaluation unit for an evaluation resulting in the control command. The higher the sampling rate in step a), the smaller are the deviations between a predefined (setpoint) and a flown (actual value) flight path of the multirotor aircraft. Concerning a multirotor aircraft of the initially mentioned type, this object is achieved in that the multirotor aircraft for the vertical take-off and landing with a supply unit for the supply of multirotor aircraft components with electrical power, as well as with at least two flight data systems which are suitable for receiving, processing and sending data and with at least three flight control systems which are suitable for receiving, processing and sending data, each with a measuring system for determining roll-pitch-yaw angle changes, said measuring system comprising a position determining system and/or a magnetic field sensor and an inertial measuring unit which comprises three acceleration sensors and three rotation rate sensors, with at least three multirotor aircraft control units which are suitable for receiving, processing and sending data, with an evaluation unit which is suitable for receiving, processing and sending data and with a control command unit which is suitable for receiving, processing and sending data, wherein the multirotor aircraft control units are each connected to a flight control system and/or each to a flight data system via a data transmission system and the multirotor aircraft control unit is designed to be able to create control data from sensor data which is provided by the flight control system and/or the flight data system, and wherein the evaluation unit which is connected to the multirotor aircraft control units and to the control command unit is designed in order to be able to evaluate the control data of the multirotor aircraft control units and to be able to provide a control command in dependence on an evaluation result value and with at least four, in particular six rotors which comprise a drive unit, wherein each drive unit comprises a control unit which is connected to the evaluation unit by way of a data transmission system and which is suitable for receiving, processing and sending data, in order to be able to control the drive units of the at least four, in particular six rotors by the control command which is transmitted to the control units. On account of the redundancy of multirotor aircraft control units and evaluation units, said redundancy being formed in the multirotor aircraft, it is ensured that the evaluation unit of the multirotor aircraft determines a control command even given a failure of redundant measuring technology, in particular of the sensor units, and transfers this control command to the control units which are connected to the drive unit, for the control of the drive units.

In an advantageous further design of the flight data system, this comprises a sensor for speed measurement, a sensor for determining the altitude, a sensor for determining the temperature and/or a sensor for determining the rate of ascent. By way of this, further important sensor data is determined, such possibly assisting in an autonomous flying of the multirotor aircraft.

The evaluation unit preferably comprises comparator, in particular two comparator. The control command is determined by way of the comparator of the evaluation unit, in particular in a software based manner, by way of a comparison of the control data. Particularly preferably, the comparator have a rank in a comparator ranking order.

The multirotor aircraft control units have a rank in a multirotor aircraft control unit ranking order. The control data of multirotor aircraft control units is likewise provided preferably in software based manner. Advantageously, the multirotor aircraft control units are designed as computers, in particular embedded PCs or the like. Further advantageously, the highest ranking comparator is connected to the multirotor aircraft control units of the same or lower rank and the other comparator are each connected to the multirotor aircraft control units of the higher, equal and lower rank. By way of this, a complete comparison can be carried out within the comparator, wherein all control data of a multirotor aircraft control unit are compared to that of a multirotor aircraft control unit which is next in rank According to an additional advantageous design of multirotor aircraft, the multirotor aircraft comprises two flight data systems, three flight control systems and three multirotor aircraft control units. The aforementioned number of flight data systems, flight control systems and multirotor aircraft control units is optimally designed for a reliable operation of the multirotor aircraft. The ratio of redundancy of components to investment costs and/or weight of the individual components for the multirotor aircraft is very advantageous in this design. Concerning an advantageous further development, two multirotor aircraft control units are connected to a flight data system and to a flight control system and a multirotor aircraft control unit is connected to a flight control system.

The comparator are suitable in order to be able to compare control data of the multirotor aircraft control units and to be able to provide a control command depending on a comparison result value which is used as an evaluation result value of the evaluation unit. The evaluation result value just as a comparison result value is a value which specifies whether the control data which is compared to one another agree precisely or in the range of a predefined tolerance. Given an agreement, the evaluation result value signalises the output of a control command.

The flight data system and/or the flight control system are preferably suitable for determining sensor data at a high frequency with a sampling rate of 1 Hz to 2 kHz. Particularly preferable is a sampling rate of 200 Hz to 1.0 kHz. Due to the high sampling rates, very much sensor data is transmitted to the multirotor aircraft control unit which converts this into control data for the evaluation unit, so that this is available in the evaluation unit for an evaluation which results in the control command. The higher the sampling rate, the smaller the deviations between a predefined (setpoint) and a flown (actual value) flight path of the multirotor aircraft, since a control command results from all sensor data of a sampling.

According to a preferred design of the multirotor aircraft, the position determining system is a global navigation satellite system or a global positioning system. These systems have the advantage that they are commercially available on the market. The data transmission system is a field bus system, preferably a serial bus system, particular preferably a controller area network. These data transmission systems likewise have the advantage of being commercially available on the market. According to an additional advantageous design of the multirotor aircraft, the supply unit comprises batteries and/or a flow machine, in particular a small gas turbine. The small gas turbine can also merely be designed as a range extender.

The multirotor aircraft furthermore comprises at least one sensor for determining the radar altitude.

BRIEF DESCRIPTION OF THE DRAWING(S)

The invention is hereinafter explained in more detail by way of the accompanying drawings. In these is show in FIG. 1 a preferred basic flow sheet for the control of a multirotor aircraft for the vertical take-off and landing.

DETAILED DESCRIPTION

FIG. 1 shows a preferred basic flow sheet of a control 1 for the control of a multirotor aircraft for the vertical take-off and landing.

The control comprises different components, in particular flight data systems 2, flight control systems 3, multirotor aircraft flight control units 4, an evaluation unit 6 comprising a comparator 5, control units 7 and control command units 8. In the embodiment example which is represented in FIG. 1, the control 1 comprises two flight data systems 2, three flight control systems 3, three multirotor flight control units 4, an evaluation unit 6 which comprises two comparator 5, six control units 7 and three control command units 8. Hence all different components of the control 1 are present redundantly.

The two flight data systems 2a, 2b each comprise at least one temperature sensor 9 for measuring the surrounding temperature and a ram pressure probe 10 for measuring the speed of the multirotor aircraft. The flight data system 2 is suitable for receiving further sensors, such as for example a barometric pressure sensor for measuring the atmospheric altitude at which the multirotor aircraft is presently situated or a sensor for determining the rate of ascent. The measurement values which are detected by the sensors of the flight data systems 2 preferably at a sampling rate having a frequency of 1 Hz to 2 kHz, in particular a frequency of 200 Hz to 1.0 kHz, are transmitted further as sensor data.

The three flight control systems 3a, 3b and 3c each comprise a position determining system 11, a magnet field sensor 12 and a measuring system for determining roll-pitch-yaw angle changes, said measuring system comprising an inertial measuring unit 13 which has three acceleration sensors and three rotation rate sensors. The sensors of the flight control systems 3 are likewise preferably sampled at a frequency of 1 Hz to 2 kHz, in particular a frequency of 200 Hz to 1.0 kHz. Particularly preferably, the sampling rates of the flight data system 2 and the flight control system 3 are adapted to one another.

The inertial measuring unit 13 serves for detecting the six possible kinematic degrees of freedom. For this, this comprise three acceleration sensors which are each perpendicular to one another and which detect a translatory movement in the x-axis, the y-axis and/or the z-axis and three rotation rate sensors which are attached perpendicularly to one another, and which detect the rotating movements about the x-axis, the y-axis and/or the z-axis. The inertial measuring unit 13 as measurement values thus provides three linear acceleration values for the translatory movement and three angular speed values for the rotation rates. After the compensation of the gravitational acceleration, as sensor data the linear speed is determined by integration and the position in space with respect to a reference point after a further integration. The integration of the three angular speeds therefore provides the orientation in space with respect to a reference point. The inertial measuring units 13 can be designed for example as fibre-optic gyroscopes or laser gyroscopes for high demands on the accuracy and micro-electrical-mechanical systems for low demands on the accuracy and stability. In the embodiment example, the inertial measuring units 13a and 13b are designed as fibre-optic gyroscopes and the inertial measuring unit 13c as micro-electrical-mechanical system.

Preferably, the position determining system 11 is a global navigation satellite system or a global positioning system. The magnetic field sensor 12 is likewise applied for determining the position. The measurement values of the position determining system 11 and the magnetic field sensor 12 are used in order to reference the measurement values of the acceleration sensors for improving the determining of the position.

The flight data systems 2 and the flight control systems 3 are each suitable for receiving, processing, and sending data, in particular sensor data. The data transmission is effected via data transmission systems 14, for example field bus systems.

The multirotor aircraft control units 4a, 4b and 4c are also suitable for receiving, processing, and sending data, in order to be able to create control data from sensor data which is provided by the flight data system 2 and/or the flight control system 3, on the basis of a predefined algorithm.

In the embodiment example, the multirotor aircraft control unit 4a is connected to the flight data system 2a and to the flight control system 3a via a data transmission system 14a and 14b respectively, which is shown as an arrow connection, the multirotor aircraft control unit 14b is connected to the flight data system 2b and to the flight control system 3b via a data transmission system 14c and 14d respectively, which is represented as an arrow connection, and the multirotor aircraft control unit 4c is connected to the flight control system 3c via a data transmission system 14e which is represented as an arrow connection. The direction of the data transmission is indicated by the arrow direction of the arrow connections.

A radar altimeter 15 for determining the exact flight altitude of the multirotor aircraft according to the radar method is additionally present according to the basic flow sheet of the control 1. This radar altimeter is likewise suitable for receiving, processing and sending data, in particular the height measurement data, which is also denoted as sensor data, and is connected to the multirotor aircraft control units 4a and 4b by way of data transmission systems 14f and 14g respectively. Furthermore, the control 1 comprises an evaluation unit 6 which is suitable for receiving, processing, and sending data, in particular control data which is created by the multirotor aircraft control units 4a, 4b and 4c. The evaluation unit 6 is connected to the multirotor aircraft control units 4a, 4b and 4c via the data transmission systems 16a, 16b and 16c. The direction of the data transmission is indicated by the arrow direction of the arrow connections. The evaluation unit 5 is configured to be able to evaluate the control data of the multirotor aircraft control units 4a, 4b and 4c and to provide a control command in dependence on the evaluation result value.

For this, the evaluation unit 6 comprises at least one comparator 5. In the embodiment example, the evaluation unit 6 comprises two comparator 5a and 5b. Hereby, the comparator 5a and 5b assume a rank in a comparator ranking order of the multirotor aircraft and the multirotor aircraft control units 4a, 4b and 4c assume a rank in a multirotor aircraft control unit ranking order of the multirotor aircraft. In the embodiment example, the ranking order corresponds to the alphabetic numbering, wherein the highest ranking comparator 5a is connected to the multirotor aircraft control units 4a and 4b of the same and lower rank and the lower ranking comparator 5b each to the multirotor aircraft control units 4a, 4b and 4c of the upper, equal and lower rank.

The evaluation unit 6 now provides a control command in dependence on a comparison result value which is used as an evaluation result value of the evaluation unit 6, as soon as this determines an exact agreement of the control data which is compared to one another in the comparator 5 or an agreement within a tolerance range with respect to the control data, wherein a comparison of the control data is effected in accordance with the ranking order of the comparator 5 from the highest ranking comparator 5a to the lowest ranking comparator 5b. The tolerance range which is stored in the comparator can be a spatial tolerance for a deviation of the control data in their spatial component, and/or a temporal tolerance for a deviation of the control data in their temporal component. The control data can therefore differ with regard to space and time. The tolerance range preferably has a deviation—spatially and/or temporally—of smaller or equal to 5% with respect to the control data which is transmitted to the comparator 5. Particularly preferably, the tolerance range has a deviation—spatially and/or temporally—of smaller or equal to 5% with respect to the highest ranking control data, which is transmitted to the comparator 5, here therefore the control data of the multirotor aircraft control unit 4a. A lower ranking comparator 5, here the comparator 5b is only required for the generation of a control command as soon as the comparison result value in the higher ranking comparator 5, here the comparator 5a, provides no agreement within a tolerance range with respect to the control data.

The evaluation unit 6 transmits a warning hint to the control command unit 8 as soon as the evaluation result value lies outside the predefined tolerance range. By way of this, it is displayed in the control command unit 8 that the evaluation unit 6 which comprises the comparator 5 has problems with the evaluation of the control data.

Given an exact agreement or an agreement in the tolerance range of the control data in the comparator 5 of the evaluation unit 6, the control data of the higher ranking multirotor aircraft control unit 4 is outputted as a control command. If for example in the embodiment example the control data in the comparator 5a agree precisely or in the tolerance range, then the control data of the multirotor aircraft control unit 4a serve a control command.

If in the highest ranking comparator 5, here comparator 5a, no comparison result value which initiates a control command and is used as an evaluation result value is achieved, i.e. there is no precise agreement of the control data which is compared in the comparator 5 or no agreement of the control data which is compared in the comparator 5 within a tolerance range, then a second comparison in the lower ranking comparator 5, here the comparator 5b is effected. The second comparison in the lower ranging comparator 5, here the comparator 5b, in the embodiment example is effected as a comparison of the control data of the higher or equal ranking multirotor aircraft control units 4 amongst one another, here the multirotor aircraft control units 4a and 4b and with the control data of the lower ranking multirotor aircraft control unit 4c.

Given an exact agreement or an agreement within a tolerance range of the control data in the comparator 5b of the evaluation unit 6, then the control data of the higher ranking multirotor aircraft control unit 4 is outputted as a control command by the evaluation unit 6. If for example in the embodiment example the control data of the comparison of the multirotor aircraft control units 4a and 4c agree exactly or within a tolerance range in the comparator 5b and there is no agreement between the sensor data of the multirotor aircraft control units 4a and 4b, then despite this the control data of the multirotor aircraft control unit 4a serve as a control command.

The evaluation unit 6 is configured, given a lack of agreement of the control data of the multirotor aircraft control units 4 which is compared to one another in the comparator 5, to actuate and initiate an emergency descent of the multirotor aircraft by way of an emergency descent unit 18 which is connected to the evaluation unit 6 via a data transmission system 17. The emergency descent unit 18 of the multirotor aircraft is designed for example as a parachute system which is activated in a pyrotechnical manner. For this, the evaluation unit 6 provides a control command for an emergency landing, preferably within a "secure" region, for example on a field.

The control command which is generated by way of the evaluation unit 6 is transmitted by way of a further data transmission system 19 to the control units 7 which are suitable for receiving, processing, and sending data. The control units 7 control a drive unit 20 on the basis of the control commands and this in turn drives a rotor of the multirotor aircraft. The multirotor aircraft comprises at least four in particular as here in the embodiment example six such drive units 20. The control units 7 are designed in a manner such that these can extract the respective control command for their assigned drive unit 20 from the transmitted control command.

The flight route of the multirotor aircraft is specified by the control command unit 8, for example by way of a pilot who is situated in a cockpit 8a, 8b by way of an input aid 21 such as a joystick or the like, or by way of a ground control station 8c, for example likewise by way of a pilot whose is situated there by way of an input aid 21 or a flight route planning 22. The control command unit 8 is suitable for receiving, processing, and sending data and is connected to the evaluation unit 6, in particular to the comparator 5a and 5b by way of a data transmission system 23. The control command unit 8 in particular comprises input aids 21, a main flight display 24, a navigation display 25 and a warning hint display unit 26.

The data transmission systems 14, 16, 17, 19 and 23 are preferably designed as field bus systems, preferably a serial bus system, particularly preferably as a controller area network.

The difference components of the control 1 are supplied with electrical power by way of a supply unit 27 which is likewise redundant. The supply unit 27 is preferably designed as a battery and/or as a flow machine, in particular as a small gas turbine. The flow machine can hereby serve as a so-called range extender for extending the range by way of the generation of electricity. All components can be responding via an interface 28 which is assigned to the component, in particular for example via an RS485 interface or an RS232 interface, for the configuration maintenance or the like. Each component thus has its own interface for configuration, maintenance, or the like.

Concluding, the method thus comprises the following steps:
   a) determining the sensor data by the sensors of the flight data system 2 and/or the flight control system 3 at a sampling rate, wherein the sampling rate preferably has a frequency of 1 Hz to 2 kHz, in particular a frequency of 200 Hz to 1.0 kHz, b) transmitting the sensor data which is determined by the flight data system 2 and/or by the flight control system 3, to the multirotor aircraft control unit 4, c) creating control data from the sensor data by way of the multirotor aircraft control unit 4, d) transmitting the control data which is created by the multirotor aircraft control unit 4, to the evaluation unit 6, e) evaluating the control data by way of the evaluation unit 6 as well as providing a control command in dependence on the evaluation result value, f) transmitting the control command to the control units 7 of the drive units 20 for the control of the at least six rotors.

The invention claimed is:

1. A method for the control of a multirotor aircraft for the vertical take-off and landing, with a supply unit for the supply of multirotor aircraft components with electrical power, as well as with at least two flight data systems which are suitable for receiving, processing and sending data and at least three flight control systems which are suitable for receiving, processing and sending data, each with a measuring system for determining roll-pitch-yaw angle changes and acceleration, said measuring system comprising a position determining system and/or a magnetic field sensor and an inertial measuring unit which comprises three acceleration sensors and three rotation rate sensors, with at least three multirotor aircraft control units which are suitable for receiving, processing and sending data, with an evaluation unit which is suitable for receiving, processing and sending data and with a control command unit which is suitable for receiving, processing and sending data, wherein the multirotor aircraft control units are each connected to a flight control system and/or each to a flight data system via a data transmission system and the multirotor aircraft control unit is designed to be able to create control data from the sensor data which is provided by the flight control system and/or the flight data system, and wherein the evaluation unit which is connected to the multirotor aircraft control units and to the control command unit is designed in order to be able to evaluate the control data of the multirotor aircraft control units and to be able to provide a control command in dependence on an evaluation result value and with at least four rotors which comprise a drive unit, wherein each drive unit comprises a control unit which is connected to the evaluation unit by way of a data transmission system and which is suitable for receiving, processing and sending data, in order to be able to control the drive units of the at least four rotors by the control command which is transmitted to the control units, wherein the method comprises the steps:

a) determining the sensor data by way of the sensors of the flight data system and/or of the flight control system at a sampling rate, b) transmitting the sensor data which is determined by the flight data system and/or by the flight control system, to the multirotor aircraft control unit, c) creating control data from the sensor data by way of the multirotor aircraft control unit, d) transmitting the control data which is created by the multirotor aircraft control unit to the evaluation unit, e) evaluating the control data by way of the evaluation unit as well as providing a control command in dependence on the evaluation result value, and f) transmitting the control command to the control units of the drive units for the control of the at least four rotors, wherein the evaluation unit comprises at least one comparator, wherein the comparator compares the control data of the multirotor aircraft control units with one another and the evaluation unit according to step e) then in dependence on a comparison result value which is used as an evaluation result value of the evaluation unit provides a control command as soon as this control command determines a precise agreement of the control data which have been compared to one another in the comparator or an agreement within a tolerance range with respect to the control data, and wherein the comparator assumes a rank in a comparator ranking order of the multirotor aircraft and the multirotor aircraft control units assume a rank in a multirotor aircraft control unit ranking order of the multirotor aircraft, wherein the highest ranking comparator is connected to the multirotor aircraft control units of the same and lower rank and the other comparator are each connected to the multirotor aircraft control units of the higher, equal and lower rank, and the evaluation unit according to step e) then in dependence on a comparison result value which is used as an evaluation result value of the evaluation unit provides a control command as soon as this control command determines a precise agreement of the control data which has been compared to one another in the comparator or an agreement within a tolerance range with respect to the control data, wherein a comparison of the control data is effected in accordance with the ranking order of the comparator from the highest ranking comparator to the lowest ranking comparator as soon as the comparison result value determines no agreement within a tolerance range with respect to the control data.

2. The method according to claim 1, wherein the control command which is provided by the evaluation unit corresponds to the control data of the highest ranking multirotor aircraft control unit which transmits the control data for a comparison in the deciding comparator.

3. The method according to claim 1, wherein the tolerance range has a spatial tolerance and/or a temporal tolerance.

4. The method according to claim 1, wherein the tolerance range has a deviation of smaller or equal to 5% with respect to control data which is transmitted to the comparator.

5. The method according to claim 4, wherein the tolerance range has a deviation of smaller or equal to 5% with respect to the highest ranking control data which is transmitted to the comparator.

6. The method according to claim 1, wherein the evaluation unit transfers a warning hint to the control command unit as soon as the evaluation result value lies outside the tolerance range.

7. The method according to claim 1, wherein the evaluation unit provides a control command for an emergency landing as soon as the evaluation result value of the lowest ranking comparator lies outside the tolerance range.

8. The method according to claim 1, wherein the sampling rate according to step a) has a frequency of 1 Hz to 2 kHz.

9. A multirotor aircraft for the vertical take-off and landing with a supply unit for the supply of multirotor aircraft components with electrical power, as well as with at least two flight data systems which are suitable for receiving, processing and sending data and with at least three flight control systems which are suitable for receiving, processing and sending data, each with a measuring system for determining roll-pitch-yaw angle changes and acceleration, said measuring system comprising a position determining system and/or a magnetic field sensor and an inertial measuring unit which comprises three acceleration sensors and three rotation rate sensors, with at least three multirotor aircraft control units which are suitable for receiving, processing and sending data, with an evaluation unit which is suitable for receiving, processing and sending data and with a control command unit which is suitable for receiving, processing and sending data, wherein the multirotor aircraft control units are each connected to a flight control system and/or each to a flight data system via a data transmission system and the multirotor aircraft control unit is designed to be able to create control data from sensor data which is provided by the flight control system and/or the flight data system, and wherein the evaluation unit which is connected to the multirotor aircraft control units and to the control command unit is designed in order to be able to evaluate the control data of the multirotor aircraft control units and to be able to provide a control command in dependence on an evaluation result value and with at least four rotors which comprise a drive unit, wherein each drive unit comprises a control unit which is connected to the evaluation unit by way of a data transmission system and which is suitable for receiving, processing and sending data, in order to be able to control the drive units of the at least four rotors by the control command which is transmitted to the control units, wherein the evaluation unit comprises a comparator and the comparator has a rank in a comparator ranking order.

10. The multirotor aircraft according to claim 9, wherein the flight data system comprises a sensor for speed measurement, a sensor for determining the altitude, a sensor for determining the temperature and/or a sensor for determining the rate of ascent.

11. The multirotor aircraft according to claim 9, wherein the multirotor aircraft control units have a rank in a multirotor aircraft control unit ranking order.

12. The multirotor aircraft according to claim 9, wherein the highest ranking comparator is connected to the multirotor aircraft control units of the same and lower rank and the other comparators are each connected to the multirotor aircraft control units of the higher, equal, and lower rank.

13. The multirotor aircraft according to claim 9, wherein the multirotor aircraft comprises two flight data systems, three flight control systems and three multirotor aircraft control units.

14. The multirotor aircraft according to claim 9, wherein two multirotor aircraft control units are connected to a flight data system and to a flight control system and a multirotor aircraft control unit is connected to a flight control system.

15. The multirotor aircraft according to claim 9, wherein the comparator is suitable to compare control data of the multirotor aircraft control units and to be able to provide a control command depending on a comparison result value which is used as an evaluation result value of the evaluation unit.

16. The multirotor aircraft according to claim 9, wherein the flight data system and/or the flight control system is suitable for determining sensor data at a high frequency with a sampling rate of 1 Hz to 2 kHz.

17. The multirotor aircraft according to claim 9, wherein the position determining system is a global navigation satellite system or a global positioning system.

18. The multirotor aircraft according to claim 9, wherein the data transmission system is a field bus system.

19. The multirotor aircraft according to claim 9, wherein the supply unit comprises batteries and/or a flow machine.

20. The multirotor aircraft according to claim 9, wherein the multirotor aircraft further comprises at least one sensor for determining the flight altitude radar.

* * * * *